Figure 1:
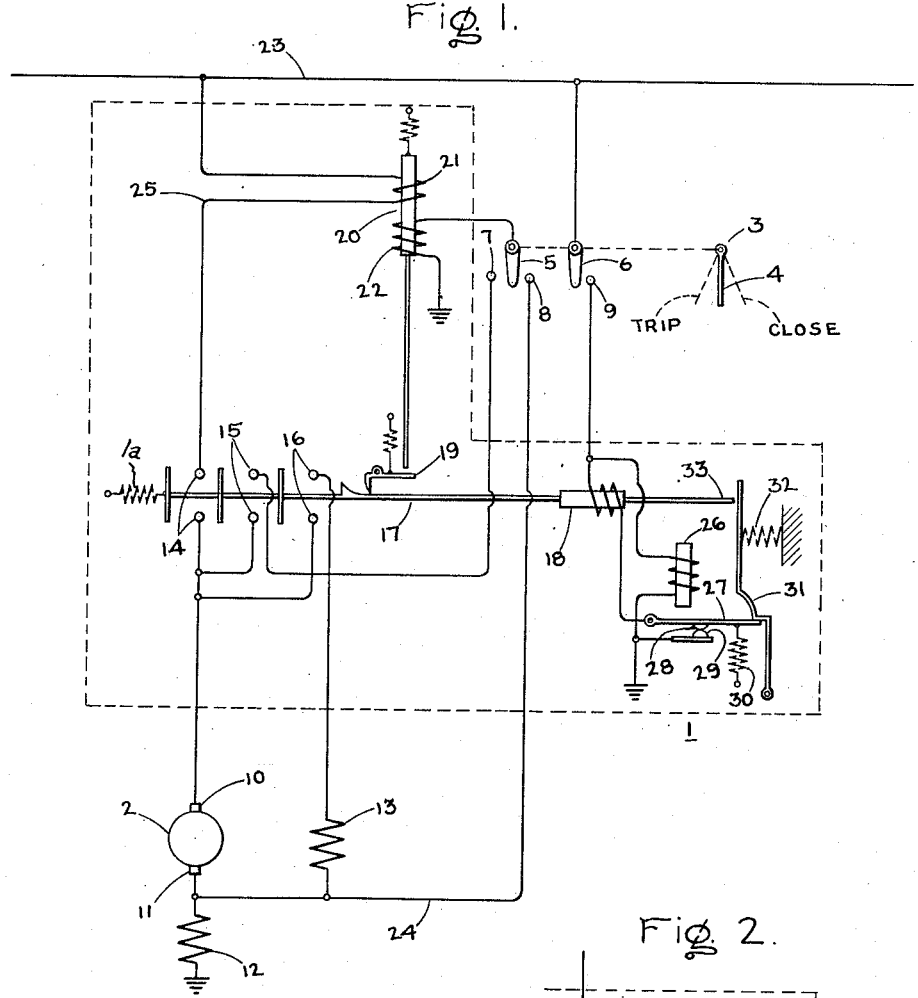

April 24, 1951   P. J. REIFSCHNEIDER   2,550,496
NONOSCILLATING PROTECTIVE CONTROL SYSTEM
Filed Jan. 14, 1950

Inventor:
Paul J. Reifschneider,
by Ernest H. Britton
His Attorney.

Patented Apr. 24, 1951

2,550,496

UNITED STATES PATENT OFFICE 2,550,496

NONOSCILLATING PROTECTIVE CONTROL SYSTEM

Paul J. Reifschneider, Springfield, Pa., assignor to General Electric Company, a corporation of New York Application January 14, 1950, Serial No. 138,674

3 Claims. (Cl. 175—294)

My invention relates to circuit interrupters and associated control systems for connecting electric apparatus to a power bus and more particularly to a system for connecting a dynamoelectric machine such as a generator to a power bus and for protecting a portion of the circuit for which protection is not usually available while preventing oscillation of the system apparatus when a circuit closing signal and a circuit tripping signal exists simultaneously.

In automatic circuit interrupters, hereinafter frequently referred to as contactors, having continuously energized closing circuits, or closing circuits which are automatically energized when the contactor is tripped, and means to trip the contactor under fault conditions, without de-energizing the closing circuit, the contactor will often "pump" or oscillate between the closed and open positions. The closing coil is energized to close the contactor, and the opening coil is simultaneously energized to open the contactor, the two being intermittently effective to cause oscillation. This results in excessive wear of the contactor itself and possible injury to the equipment controlled by the contactor.

It is, therefore, an object of my invention to provide a contactor which will not oscillate, being provided to operate only once in the closing direction and once in the opening direction for each closure of the contactor operating switch.

A further problem occurs in the protection of circuits for dynamoelectric machines, and especially in generators, in that the section of conductor between the contactor and the armature of the machine may develop a short circuit which will not be detected by the usual system protective devices.

It is, therefore, a further object of my invention to provide for a non-oscillating control system which protects against faults in the line between the control contactor and the controlled apparatus.

My invention, therefore, consists generally in a control system for a dynamoelectric machine wherein oscillation of the control contactor is avoided by means of a continuously energized holding solenoid which maintains the closing solenoid circuit in an open condition after a holding coil armature has been released by a latch operable at the end of the closing coil solenoid travel. The contactor is operable to trip open by means of an opening solenoid operated latch, the opening solenoid having differentially connected coils, one of which measures the current through the contactor and the other of which measures the current through the dynamoelectric machine, an unbalance between these measured currents indicating a fault condition between the contactor and the dynamoelectric machine and causing the solenoid to trip the contactor.

For additional objects and advantages, and for a better understanding of the invention, attention is now directed to the following description and the accompanying drawing, and also to the appended claims in which the novel features of the invention are particularly pointed out.

Figure 2:
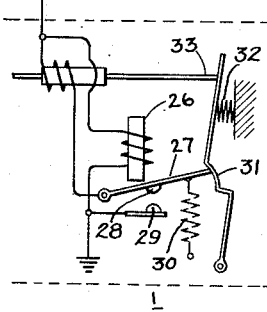

In Fig. 1 of the drawing, a contactor and associated control circuit are schematically shown which incorporate the features of my invention, and Fig. 2 is a schematic view of the closing and holding solenoids and associated apparatus in the contactor closed position.

Referring more particularly to the drawing, in Fig. 1 there is shown a contactor designated as a whole as 1, together with a dynamoelectric machine 2 which is controlled by the contactor and a switch 3 which is manually operable to cause the contactor to move to the open or closed position. This switching is accomplished by means of a manually operable switch handle 4 with which switch levers 5 and 6 may be operated to co-operate with fixed contacts 7, 8, and 9, lever 5 engaging contact 7 in the "trip" position and levers 5 and 6 respectively engaging contacts 8 and 9 in the "close" position.

Dynamoelectric machine 2, which in the embodiment shown is used as a generator, includes current collectors 10 and 11 and a series field 12. A shunt field 13 may also be provided.

The contactor 1 is shown as comprising main contacts 14 and auxiliary contacts 15 and 16 which may be closed through an operating rod 17 by means of a closing solenoid 18 and latched in the closed position by means of latch 19. A differentially energized solenoid 20 having coils 21 and 22 is provided to trip latch 19 to cause opening of the contactor by an opening force supplied by a tension spring 1a.

At the top of the diagram there is shown a main power bus 23 to which the generator 2 supplies power, the circuit from power bus 23 through the generator 2 includes solenoid coil 21, main contacts 14, current collectors 10 and 11 and series field coil 12. Coil 22 is normally connected in parallel with series coil 12 of generator 2 by means of a conductor 24 and switch contact 8 and switch lever 5. Thus, the solenoid 20 measures the current between bus 23 and the contacts 14 by means of solenoid coil 21, while also measuring the current through generator 2 by means of solenoid coil 22 which measures the voltage drop across series field coil 12. During normal energization and operation of generator 2, the magnetomotive forces derived from solenoid coils 21 and 22 of solenoid 20 exactly cancel one another and the solenoid 20 does not move to trip latch 19. But if a fault develops, such as a short circuit to ground at any circuit location below point 25 at the lower terminal of coil 21 on the diagram, including any location at field windings 12 and 13, the currents measured by solenoid coils 21 and 22 will be unequal, and the resulting unbalance in the magnetomotive forces provided by coils 21 and 22 will cause solenoid 20 to operate to trip latch 19 and open contactor 1. The generator armature circuit is thus interrupted at contacts 14, de-energizing field winding 12 and reducing the generator voltage. Shunt winding 13, which is energized through auxiliary contacts 16, is also de-energized by the opening of these contacts to further reduce the generator voltage so that the fault causes no damage until discovered and corrected.

Associated with closing solenoid 18 in the contactor is a holding solenoid 26 and a holding solenoid armature switch lever 27 having a movable contact 28 which co-operates with a fixed contact 29. Lever 27 is biased downwardly by a spring 30 and is also retained firmly in the position shown, when the contactor is in the unenergized position, by a latch member 31 which is spring biased in a counterclockwise direction by a compression spring 32. An extension 33 of operating rod 17 is adapted to engage latch member 31 at the end of the travel of solenoid core 18 to thereby disengage armature lever 27 to allow the armature to be attracted by holding solenoid 26. This operation is shown in Fig. 2.

The above operation of closing solenoid 18, holding solenoid 26 and the associated apparatus occurs each time switch 3 is operated to the "close" position, making contact between switch lever 6 and fixed contact 9 to complete a circuit from power bus 23 through both solenoids 18 and 26 to ground. Holding solenoid 26 will thereafter be continuously energized until switch 3 is again operated to separate lever 6 and contact 9. But by the operation of closing, solenoid 18 which moves latch member 31 as shown in Fig. 2 to allow the holding solenoid armature lever 27 to be attracted by holding solenoid 26, contacts 28 and 29 are separated, thereby interrupting the circuit through the closing solenoid. This interruption occurs, however, after latch 19 has been engaged to maintain the contactor in the closed position. If the contactor is opened by a fault condition which causes latch 19 to be tripped, or by any condition other than the operation of switch 3, the holding solenoid 26 will continue to maintain contacts 28 and 29 in the open position and closing solenoid 18 will not be re-energized to reclose the contactor so that continued reclosures and tripping, often referred to as "pumping" or oscillation, cannot occur. Upon subsequent operation of switch 3, separating contacts 6 and 9, holding solenoid 26 will be de-energized and armature lever 27 will return to the original position shown in Fig. 1 under the influence of biasing spring 30. This movement is facilitated by the arcuate shape of the portion of latch member 31 engaged by lever 27 when in the attacted position.

A contactor trip circuit for "remote" tripping from switch 3 is provided through auxiliary contacts 15 and operating switch contact 7 and lever 5 whereby trip solenoid coil 22 is energized from the high voltage side of generator 2, thus unbalancing solenoid coils 21 and 22 and causing operation of the trip solenoid 20. The higher current in solenoid coil 22 will not be injurious since contacts 15 immediately interrupt the circuit as the contactor opens. However, a current limiting resistor, not shown, may be used in this trip circuit if necessary.

It will be seen from the above that this invention provides an improved, economical, anti-pumping contactor and control for the protection of a dynamoelectric machine which includes protection against ground faults in normally unprotected sections of the power system of the dynamoelectric machine.

Accordingly, while I have described and illustrated a preferred embodiment of my invention, I wish it to be understood that I do not intend to be restricted solely thereto but that I do not intend to cover all modifications thereof which would be apparent to one skilled in the art and which come within the spirit and scope of my invention.

What I claim as new and desire to secure by Letters Patent of the United States is:

1. In a protective control system for a dynamo-electric machine, a latch type circuit interrupter including a trip latch, a latch trip solenoid having a first winding connected to measure the current through the circuit interrupter and a second winding connected in opposition to said first winding to measure the current through the dynamoelectric machine, said solenoid thereby being sensitive to differences in said currents caused by faults in said system to cause tripping of said interrupter, said interrupter including a closing solenoid adapted to be energized only at the time of closing of said circuit interrupter and a holding solenoid having an armature lever and associated movable contacts arranged in the circuit of said closing solenoid whereby operation of said armature lever in response to the magnetic attraction of said holding solenoid interrupts the circuit of said closing solenoid, and a latch member for restraining said armature lever against the attraction of said holding solenoid to maintain said contact in the closed position, and an operating rod associated with said closing solenoid for co-operation with said latch member to release said armature lever by movement of said latch member at the end of the travel of said closing solenoid after said trip latch has been engaged.

2. In a protective control system for a dynamo-electric machine, a latch type circuit interrupter including a latch trip solenoid having a first winding connected to measure the current through the circuit interrupter and a second winding connected in opposition to said first winding to measure the current through the dynamoelectric machine, said solenoid thereby being sensitive to differences in said currents caused by faults in said system to cause tripping of said interrupter, said interrupter including a closing solenoid to move the interrupter into the latched closed position, a holding solenoid having an armature lever with associated contacts spring-biased to the closed position, means for simultaneously energizing said closing and holding solenoids, a latch member for retaining said contacts in said closed position, said latch member being constructed and arranged to be moved to the unlatched position by said closing solenoid after said interrupter is in the latched closed position thereby to release said armature lever for attraction by said holding solenoid to open said contacts, said contacts being arranged in series with said closing solenoid so as to de-energize said closing solenoid when open, said holding solenoid being arranged to be continuously energized to hold said contacts in the open position until de-energization of said control system.

3. In a protective control system including a latch type circuit interrupter, a multiple-contact control switch therefor having a first position to close said interrupter and a second position to open said interrupter, and opening solenoid to release the latch of said circuit interrupter to cause said interrupter to open, said opening solenoid having a current coil connected to measure the current through said interrupter and a voltage coil connected in opposition to said first winding to measure the voltage across a portion of the load supplied through said contactor for thereby measuring the current through said load, the magneto-motive forces set up by said coils being equal and opposite and cancelling one another if the respective currents measured by said coils are equal to prevent operation of said solenoid, but arranged to cause operation of said solenoid to open said interrupter if said measured currents are unequal due to a fault condition, said control switch, when in said second position, being adapted to increase the energization of said voltage coil of said opening solenoid to cause operation of said solenoid to open said circuit interrupter, said interrupter including a closing solenoid and a holding solenoid connected to be simultaneously energized when said operating switch is in the circuit interrupter closing position, said holding solenoid having an armature lever with associated contacts spring-biased to the closed position, a latch member for retaining said contacts in said closed position, said latch member being constructed and arranged to be moved to the unlatched position by said closing solenoid after said interrupter is in the latched closed position thereby to release said armature lever for attraction by said holding solenoid to open said contacts, said contacts being arranged in series with said closing solenoid so as to de-energize said closing solenoid when open, said holding solenoid being arranged to be continuously energized to hold said contacts in the open position until movement of said switch from said first position.

PAUL J. REIFSCHNEIDER.

REFERENCES CITED

The following references are of record in the file of this patent:

UNITED STATES PATENTS

| Number | Name | Date |
|---|---|---|
| 1,023,264 | McElroy | Apr. 16, 1912 |
| 1,180,751 | Wolff | Apr. 25, 1916 |
| 1,731,955 | Von Schaubert | Oct. 15, 1929 |